3,272,642
COATING PROCESS AND COMPOSITIONS CONTAINING METAL ALCOHOLATES AND ALKYL ESTERS
Joseph F. Nelson, Westfield, N.J., assignor to Esso Research and Engineering Company, a corporation of Delaware
No Drawing. Filed June 30, 1958, Ser. No. 745,263
12 Claims. (Cl. 106—285)

The invention relates to hard, chemical resistant, protective films and more specifically to films produced when drying oils are cured with the aid of alkyl esters and metal alcoholates.

It is known to prepare drying oils by polymerizing conjugated diolefins, such as butadiene, isoprene, piperylene, etc. or copolymerizing such diolefins with vinyl aromatics such as styrene, or alkyl aromatics, such as toluene, ethyl benzene, etc. These processes may be carried out in the presence of catalysts such as sodium. Peroxide catalysts may also be used for the copolymerization of the diolefins and vinyl aromatics. Thus, oils are prepared which, when dissolved in an equal quantity of hydrocarbon solvent such as mineral spirits, generally have a viscosity at 25° C. between about 0.1 and 20 poises, or about 400 to 20,000 poises when diluent-free.

The oils thus obtained are particularly useful as protective coatings in the form of colorless varnishes or enamels and may be either air dried or baked. However, it has been found by experience that the coatings, particularly the baked films, have a tendency to dry on the surface. When thicker films of the varnish or enamel are applied to metal to be cured by baking, the surface dries sealing off the lower portion of the film thus retarding oxidation and curing, with the result that a tack-free surface covering a soft substrate is obtained. The soft portion makes the film subject to marring and abrasion without appreciable force being applied.

These oils are also useful for coating the interior of food cans. However, it has been found by experience that these oils do not properly wet the surface of metals such as tin plate or can maker's quality steel. The films are usually used in thicknesses of .25 to .30 mil and are cured by baking prior to the forming of the can. Experience shows that severe eyeholing occurs and many holidays appear in the films. The films may also craze or crack. This is particularly true when certain batches of tin plate are used.

It has now been found that by curing these polymer oils by baking films thereof at an elevated temperature in the presence of alkyl esters or metal alcoholates, they form products that are hard and which strongly resist chemical attack. These properties are very valuable especially where the polymers are used to coat articles which are subject to abrasion or splattering with chemicals. It has also been discovered that good results are often obtained where the polymer oil contains functional groups having an active hydrogen and where the thickness of the film applied to the article is between 0.25 and 10 mils.

The polymers of butadiene-1,3 suitable for use in accordance with the present invention comprise the homopolymers of butadiene-1,3; the copolymers of butadiene-1,3 with styrene in which the butadiene-1,3 constitutes the major proportion, preferably at least 75% by weight; as well as the homopolymers and copolymers of butadiene-1,3 modified by a minor proportion of maleic acid, fumaric acid, thioglycolic acid, thiosalicyclic acid, mercapto phthalic acid, itaconic acid, mesaconic acid, citraconic acid, acrylic acid and the esters and anhydrides thereof, this proportion not exceeding ordinarily about 2% by weight but in no case should it exceed the amount which will cause gelation of the product. The modification by means of the acid anhydride may be effected either as a post treatment of the polymer formed or during the course of the polymerization of the butadiene. The butadiene polymers in some instances may contain an amount of maleic or citraconic anhydride exceeding 2%, up to 10% for example. In this instance additional quantities of the non-modified butadiene polymer may be added so that the entire amount of acid anhydride does not exceed 2% by weight of the polymer and preferably does not exceed 1% on the same basis.

The preferred polymers of butadiene-1,3 are the oily liquid polymers having a molecular weight in the range of about 1,000 to about 10,000. Satisfactory coatings can be made equally as well from butadiene polymers having a molecular weight between 700 and 20,000. When the polymers of higher molecular weight are used in the process of the present invention, the non-volatile content of the coating composition thus obtained is ordinarily very low at the viscosities normally used, in particular when it is desirable to lay down a single layer forming a coating of sufficient thickness to give adequate protection.

Such synthetic oils may be advantageously prepared by mass polymerization either in the presence of a hydrocarbon soluble peroxide catalyst such as benzoyl peroxide or cumene hydroperoxide or in the presence of metallic sodium. Suitable polymerization procedures are illustrated below in Runs A and B. Throughout the present description it will be understood that all proportions are expressed on a weight basis unless otherwise specified.

*Run A.*—For example, 100 parts of butadiene-1,3, 50 parts of straight run mineral spirits boiling between 150° and 200° C. (Varsol), 3 parts of t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. Patent 2,586,594 of Arundale et al., issued on February 19, 1952, which describes alternative monomers, catalysts, reaction diluents polymerization modifiers, suitable ranges of proportions of the various ingredients, suitable ranges of polymerization conditions, etc.

*Run B.*—An alternative polymerization method using sodium as catalyst is illustrated as follows: 80 parts of butadiene-1,3, 20 parts of styrene, 200 parts of straight run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or the like and filtered. The colorless filtrate is then fractionally distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 10,000, preferably between about 2,000 to 5,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having more than 2 carbon atoms such as methyl ethyl ether, or the modifier may be omitted altogether, especially when it is not essential to obtain a perfectly colorless product. Similarly, isopropanol is not necessary, though aliphatic alcohols generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 200° C., e.g., butane, benzene, xylene, cyclohexane and the like. The diluents are usually used in amounts ranging from 50 to 500 parts per 100 parts of monomer. The reaction temperature may vary between about 40° C. and 105° C., preferably around 65° to 85° C. As a catalyst, 0.1 to 10 parts of dispersed metallic sodium is used per 100 parts of monomers, sodium particle sized below 100 microns being particularly effective.

Functional groups containing active hydrogens may be introduced into the polymer oil if desired prior to blending with the metal alcoholates or alkyl esters. This may be accomplished by oxidizing it with an oxygen-containing gas or a peracid, reacting it with an oxygen-containing compound, such as maleic anhydride, or with an acid such as thioglycolic acid, etc.

For instance, the polymer oil may be blown with air or oxygen in the presence of a cobalt, lead, iron or manganese catalyst at between 20° and 150° C. for about 1 to 2 hours in the presence or absence, depending on the viscosity, of an inert solvent. Polymer oils so treated generally contain from about 5 up to 20 wt. percent of combined oxygen. Another method of introducing functional groups involve combining the polymer oil with an unsaturated organic compound having a carboxyl group or anhydride or ester thereof, e.g., maleic acid, fumaric acid, thioglycolic acid, thiosalicylic acid, mercaptophthalic acid, itaconic acid, mesaconic acid, citraconic acid, acrylic acid, their anhydrides or esters. These compounds may be added in any amount up to incipient gelation, but amounts between 0.01 and 15% are suitable. The reaction is carried out by heating the reactants for about an hour at between about 50° and 250° C. Also, if desired, the polymer oil may be epoxidized at a temperature between about 20° and 50° C. with a peracid such as peracetic acid.

The alkyl esters and metal alcoholates suitable for reacting with the original polymer oil or with the polymer oil after it has been reacted with the acid, anhydride or ester or after it has been oxidized as described above include triamyl borate, tri octyl borate, tri amyl borate, tri butyl phosphate, and aluminum isopropylate. It is necessary to use at least 1% based on the weight of the butadiene polymer of these compounds in order to give practical improvement of the properties of the coating. Significant improvements do not occur when these materials are used in amounts of more than 10%, although it is possible to use them in amounts as high as 15%. Concentration of about 1 to 6% is preferable. The borates, or the aluminates of aliphatic alcohols of 4 to 20 carbon atoms or their mixtures are also suitable.

The polymer, either in its conventional or modified form, is mixed with an alkyl ester or metal alcoholate and cured at an elevated temperature, preferably between about 120° and 200° C., for from a few minutes up to several hours, e.g., 5 minutes to 2 hours, generally under atmospheric pressure. The combination of polymer oil and ester or alcoholate may be cured in bulk form or applied to some article and baked. In the latter case, the mixture may be applied at a temperature between about 10° and 40° C. with a brush, spray or any other conventional means that will preferably produce a film about 0.25 to 3.0 mils thick and then baked at, say, about 140° to 210° C. to the desired hardness. The preferred films have a Sward hardness of about 30 to 50.

The advantages of this invention are illustrated by the following examples:

Example 1

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash, 105° F.; boiling range, 150° to 200° C.; solvent power, 33–37 Kauri-Butanol value (reference scale: Benzene—100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and the product was finished to contain 50% non-volatile matter as described in earlier parts of this specification. The resulting product had a viscosity of 1.5 poise at 50% N.V.M. and the non-volatile portion thereof had an average molecular weight of about 3,000.

Example 2

The oil of Example 1 was subjected to an after treatment which consisted of heating the oil at 175° C. for two hours in the presence of 1.0% maleic anhydride. The resulting oil was then poured on thin steel panels to form coatings of 1.65 mils and baked for 30 minutes at 325° F. The oil proved to be rather slow drying and found to have a Sward hardness value of 5–8 (Glass=100).

Example 3

10 grams of the polymer oil (59% N.V.M.) of Example 2 containing 1% maleic anhydride and having a viscosity of 3 poises at 50% N.V.M. was mixed with 0.1 gram (1%) of triamyl borate. The mixture was stirred becoming slightly turbid. No evidence of a viscosity change was noted. No gel was formed nor were there any signs of objectionable heterogeneity. Films of the mixture were prepared on tinplate panels and baked 30 minutes at 300° F. and 325° F. The Sward rocker hardness of the films after baking was determined with the following results:

| Film | Curing Temp., ° F. | Sward Hardness (Glass-100%) |
|---|---|---|
| Oil + m.a.[1] + ester | 300 | 8 |
| Oil + m.a.[1] | 300 | 2 |
| Oil + m.a.[1] + ester | 325 | 18 |
| Oil + m.a.[1] | 325 | 5 |

[1] Maleic anhydride.

It is evident from the above data that the Sward hardness of the oil is increased three or four times that of the original maleic anhydride-treated oil by the reaction with the alkyl ester and metal alcoholate.

Example 4

The polymer oil (maleic anhydride-treated) of Example 2 was blended with various amounts of other metallic esters as in Example 3 and the baked films tested for hardness. The results are shown in the following table:

TABLE I.—THE EFFECT OF ALKYL ESTERS ON POLYMER OIL BAKED FILM HARDNESS

| Sample | Ester Added | Percent | Bake | | Hardness | | Control [1] | | Percent Maleic Anhydride in Polymer Oil |
|---|---|---|---|---|---|---|---|---|---|
| | | | Time, min. | Temperature, °F. | Thick, mils | Sward | Thick | Sward | |
| 1 | Tri Octyl borate | 1.0 | 30 | 325 | 2.0 | 8 | 2.0 | 4 | 1.0 |
| 2 | ---do--- | 1.0 | 30 | 325 | 1.7 | 14 | 1.7 | 8 | 3.0 |
| 3 | ---do--- | 5.0 | 30 | 325 | 2.0 | 14 | 2.0 | 8 | 0.2 |
| 4 | ---do--- | 5.0 | 60 | 325 | 2.0 | 26 | 2.0 | 18 | 1.0 |
| 5 | ---do--- | 2.0 | 30 | 300 | 1.9 | 4 | 1.9 | 0 | 1.0 |
| 6 | Tri butyl phosphate | 1.0 | 30 | 300 | 2.2 | 4 | 1.9 | 0 | 1.0 |

[1] Identical evaluations made in the absence of added ester.

*Example 5*

Various amounts of aluminum triisopropylate and aluminum amylate were added to the oils of Examples 1 and 2 and thin films of between .25 and .3 mil in thickness were laid down on tinplate and cured for 10 minutes at 400° F. After curing the films were examined for eyeholes and rated according to the following scale: 0—no eyeholes; 1—few eyeholes; 2 to 3—minor eyeholes; 4—severe eyeholes. The following data were obtained:

ADDITION OF ALUMINUM ALCOHOLATES TO POLYMER OIL

| Polymer Oil Used | Percent Additives Based on Polymer Solids | Eyehole Rating |
|---|---|---|
| 60% NVM Oil A | None, control | 4 |
| 60% NVM Oil B | ---do--- | 3 |
| 60% NVM Oil A | 6 Al isopropylate + 5-ethyl hexanol | 0 |
| 50% NVM Oil A | 6 Al isopropylate + 5 isooctyl alc | 0 |
| 50% NVM Oil A | 6 Al isopropylate + 5 n-amyl alcohol | 0 |
| 50% NVM Oil A | 3 Al isopropylate + 5 isooctyl alc | 0 |
| 50% NVM Oil A | 3 Al isopropylate + 2 2-ethyl hexanol | 0 |
| 60% NVM Oil B | 2 Al isopropylate | 0 |
| 50% NVM Oil B | ---do--- | 0 |
| 50% NVM Oil B | 1 Al isopropylate + 5 n-butanol | 0 |
| 50% NVM Oil B | 1 Al isopropylate + 20 isopropanol | 0 |
| 50% NVM Oil B | 1 Al amylate + 20 isopropanol | 0 |
| 50% NVM Oil B | 2 Al amylate + 20 isopropanol | 0 |
| 50% NVM 50 Oil A/50 Oil B | 4 Al isopropylate + 5 isooctyl alc | 0 |
| 50% NVM 75 Oil A/25 Oil B | 6 Al isopropylate + 10 isooctyl alc | 0 |
| 60% NVM 75 Oil A/25 Oil B | 6 Al isopropylate + 5 isooctyl alc | 0 |
| 50% NVM Oil B | 1 Al isopropylate + 5 n-butanol | 0 |
| 50% NVM Oil B | 1 Al isopropylate + 2 methanol | 0 |
| 50% NVM Oil A | 5 2-ethyl hexanol | 4 |

NOTE: 0.25–0.3 mil films cured 10 minutes at 400° F.
A = Oil of Example 1.
B = Oil of Example 2.

*Example 6*

A mixture of 3 parts of ethyl hexanol and 3 parts of the aluminum mixed alcoholate of one part of isopropyl alcohol to two parts of 2-ethyl hexanol were added to the oil of Example 2 and .3 mil films laid down and cured by baking for 10 minutes at 400° F. No eyeholes were found in the cured film.

From the above examples it is readily seen that the combination of polymer oil or enamels made therefrom and alkyl esters such as borates, or phosphates, or the metal alcoholates offer coating compositions which will bake with greatly improved hardness values. Examples 5 and 6 show that the aluminum alcoholates effectively prevent eyeholding of the films.

The nature of the present invention having been thus fully set forth and specific examples of the same given, what is claimed as new and useful and desired to be secured by Letters Patent is:

1. A process of preparing a liquid coating composition which comprises mixing (A) at least one oily butadiene polymer characterized by an average molecular weight from about 700 to about 20,000 selected from the class consisting of (1) homopolymers of butadiene-1,3, (2) copolymers of butadiene-1,3 and styrene having at least 73% by weight of copolymerized units of butadiene-1,3 and (3) said homopolymers and said copolymers modified with an anhydride of an unsaturated dicarboxylic acid selected from the class consisting of maleic anhydride and citraconic anhydride in an amount up to 20% by weight of said polymers with (B) 1 to 15%, based on the weight of component (A), of a compound selected from the class of triamyl borate, trioctyl borate, tributyl phosphate, and aluminum isopropylate.

2. A coating composition consisting essentially of (A) at least one oily butadiene polymer characterized by a molecular weight from about 700 to about 20,000 selected from the class consisting of (1) homopolymers of butadiene-1,3 (2) copolymers of butadiene-1,3 and styrene, said homopolymers and said copolymers modified with an anhydride of an unsaturated carboxylic acid selected from the group consisting of maleic anhydride, fumaric anhydride, thioglycolic anhydride, thiosalicylic anhydride, mercaptophthalic anhydride, itaconic anhydride, mesaconic anhydride, citraconic anhydride, and acrylic anhydride, and (B) 1 to 15% by wt. of component (A) of a compound selected from the group consisting of triamyl borate, tri-octyl tributyl phosphate, and aluminum isopropylate.

3. A coating composition consisting essentially of a copolymer of butadiene-1,3 and styrene characterized by a molecular weight from about 700 to about 20,000 modified with maleic anhydride; and 1 to 15% by wt. of said copolymer of triamyl borate.

4. A coating composition consisting essentially of a copolymer of butadiene-1,3 and styrene characterized by a molecular weight from about 700 to about 20,000 modified with maleic anhydride; and 1 to 15% by wt. of said copolymer of trioctyl borate.

5. A coating composition consisting essentially of a copolymer of butadiene-1,3 and styrene characterized by a molecular weight from about 700 to 20,000 modified with maleic anhydride; and 1 to 15% by wt. of said copolymer of tributyl phosphate.

6. A coating composition consisting essentially of a copolymer of butadiene-1,3 and styrene characterized by a molecular weight from about 700 to 20,000 modified with maleic anhydride; and 1 to 15% by wt. of said copolymer of isopropyl aluminate.

7. A coating composition consisting essentially of an oily butadiene polymer characterized by a molecular weight from about 700 to about 20,000 and 1 to 15% by wt. of said polymer of triamyl borate.

8. A coating composition consisting essentially of an oily butadiene polymer characterized by a molecular weight from about 700 to about 20,000 and 1 to 15% by wt. of said polymer of trioctyl borate.

9. A coating composition consisting essentially of an oily butadiene polymer characterized by a molecular weight from about 700 to about 20,000 and 1 to 15% by wt. of said polymer of tributyl phosphate.

10. A coating composition consisting essentially of an oily butadiene polymer characterized by a molecular weight from about 700 to about 20,000 and 1 to 15% by wt. of said polymer of isopropyl aluminate.

11. A process of preparing a formable organic coated sheet metal substrate which comprises applying to at least one surface of a thin sheet metal substrate a thin coat of the liquid coating composition of claim 2, said coat having a thickness of about 0.25 to 3.0 mils, drying said coating by volatile loss of solvent therefrom and curing the resulting coating by heating at 280° to 410° F. for five minutes to sixty minutes.

12. The process of claim 1 wherein (B) in the liquid coating composition is isopropyl aluminate.

References Cited by the Examiner

UNITED STATES PATENTS

| | | | |
|---|---|---|---|
| 2,569,383 | 9/1951 | Leyonmark et al. | |
| 2,652,342 | 9/1953 | Gleason | 106—285 |
| 2,892,780 | 6/1959 | Rinse | 106—285 |

FOREIGN PATENTS 154,231   11/1953   Australia.

OTHER REFERENCES

Kraitzer et al.: "Jour. Oil Colour Chem. Assoc." 31 (1948), pp. 405–417 Nat'l Bureau Standards Library.

Kronstern, "Paint and Varnish Production," 30 No. 8 (1950), pp. 10–13 and 20 Nat'l Bureau Standards Library.

Winter, "Paint Oil & Chemical" Rev., June 21, 1951, pp. 12, 40 and 41.

ALEXANDER H. BRODMERKEL, *Primary Examiner.*

JOHN R. SPECK, *Examiner.*

O. STEARNS, V. O. KEEFE, J. POER, J. B. EVANS, *Assistant Examiners.*